United States Patent Office 2,807,521
Patented Sept. 24, 1957

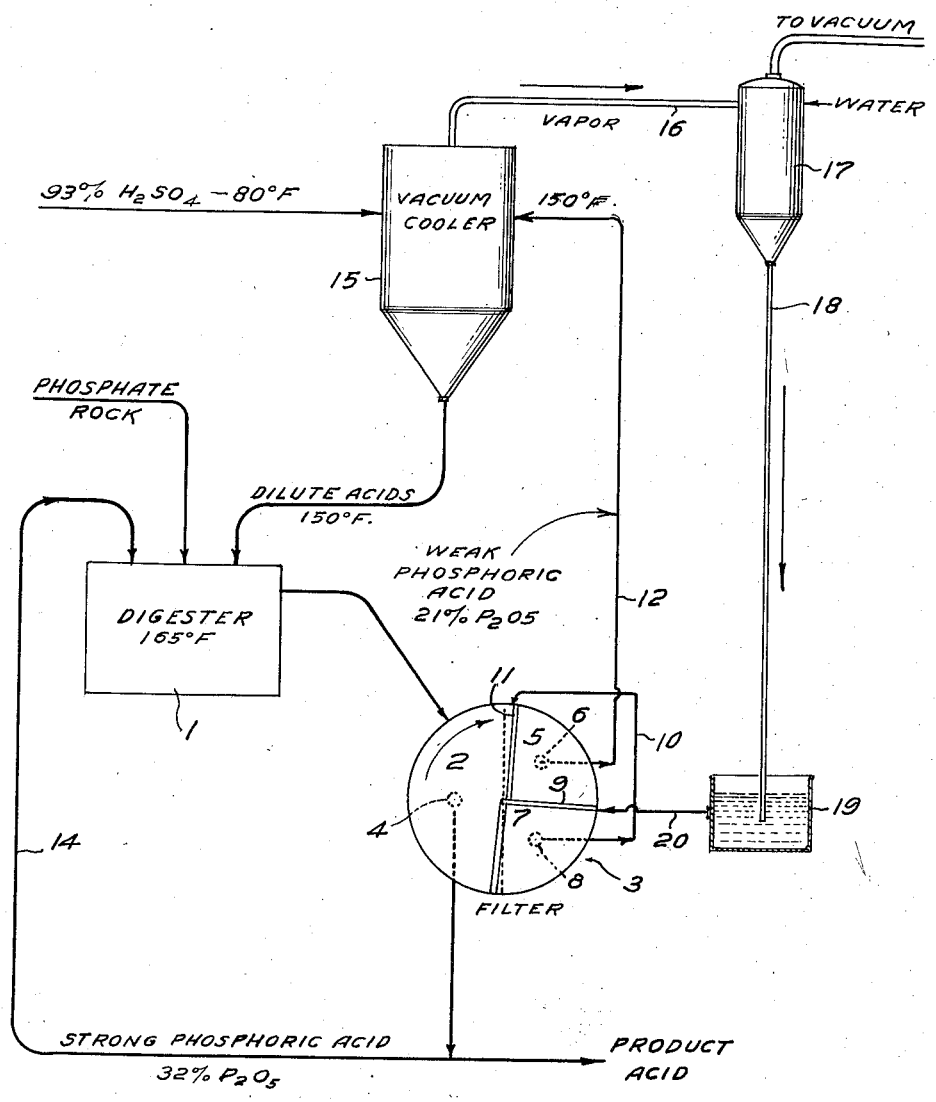

2,807,521

PHOSPHORIC ACID MANUFACTURE

Wendell B. Lambe, Staten Island, N. Y., and Alfred R. Smith, Plainfield, and Herbert Otani, Dunellen, N. J., assignors to Chemical Construction Corporation, New York, N. Y., a corporation of Delaware Application November 9, 1953, Serial No. 390,814

2 Claims. (Cl. 23—165)

This invention relates to methods and apparatus for producing phosphoric acid by processes wherein ground phosphate rock is digested with sulfuric acid and the resulting calcium sulfate-phosphoric acid slurry is filtered to recover phosphoric acid therefrom. The invention is directed particularly to the introduction into such processes of the new process steps hereinafter described, and to new combinations of apparatus elements wherein these new process steps are performed.

In phosphoric acid manufacturing processes of the type referred to above it is now a common practice to recycle a substantial proportion of the strong phosphoric acid obtained as filtrate to the digester. This increases the strength of the product phosphoric acid. It is also common practice to recycle to the digestion step a part or all of the dilute aqueous phosphoric acid obtained by washing the calcium sulfate filter cake. Our present invention is particularly applicable to processes wherein weak phosphoric acid is so recycled.

In processes of the type under consideration it is highly desirable to carry out the phosphate rock digestion under conditions producing an easily filterable and washable calcium sulfate. Experience has shown that larger and more easily filterable calcium sulfate crystals are obtained when the digestion sulfuric acid is introduced to the digester in a relatively dilute condition and the digestion system is maintained at relatively low temperatures, such as at about 140–170° F., since under these conditions a stable calcium sulfate dihydrate will form. With stronger sulfuric acid and with higher digestion temperatures calcium sulfate dihydrate is less stable, particularly in the presence of the added strong phosphoric acid that is recycled to increase the strength of the final product acid. For this reason the dilution of the digestion acid and cooling of this acid to maintain optimum digestion temperatures is quite important.

The process of our invention takes advantage of the increase in the water vapor pressure that occurs at the decreased concentration and elevated temperature when concentrated sulfuric acid is diluted with hot weak phosphoric acid from the washing of the filter. By applying a vacuum to this mixture the heat of dilution of the sulfuric acid is removed by evaporation and the temperature reduced to desirable digester conditions. Simultaneously a proportion of its water content is removed by vacuum evaporation. In this process effective heat removal is obtained without the scaling of heat transfer surfaces, which would occur if water-cooled heat transfer surfaces were employed. It will be understood that at the elevated filtration and washing temperatures employed calcium sulfate is appreciably soluble in water, and the dilute wash water therefore contains small but substantial quantities of dissolved calcium sulfate. Much of this dissolved calcium sulfate would be deposited as scale if an ordinary water-cooled acid cooler were employed.

The sulfuric acid used in phosphoric acid manufacturing plants is usually supplied and used as concentrated sulfuric acid of about 66° Baumé or stronger. This concentrated sulfuric acid may be diluted to lower concentrations, and the heat of dilution removed by conventional methods before it is introduced into the sulfate rock digester. Such procedure adversely affects the water balance of the operation, either reducing the effectiveness of filter washing or reducing the obtainable strength of phosphoric acid. In practicing our invention we dilute the concentrated sulfuric acid to the necessary extent by mixing it with hot dilute aqueous phosphoric acid from the filter wash, thus producing a sulfuric acid-phosphoric acid mixture for use in the digester without affecting the water balance. In order to increase still further the phosphoric acid content of the digestion acid our invention utilizes the heat of dilution of the concentrated sulfuric acid to evaporate water from the acid mixture by vacuum evaporation, thereby increasing the strength of phosphoric acid produced without reduction of water utilized in the filter washing.

The invention will be further described with reference to the accompanying drawing wherein the single figure is a flow sheet illustrating an embodiment of the process of our invention and also showing the novel combination of apparatus employed therein.

In this drawing reference numeral 1 represents a phosphate rock digester system, which usually consists of a series of two or more open digestion tanks of acid-resistant construction provided with agitators and operating in cascade. The lowermost digestion tank of the cascade system is provided with an outlet pipe discharging upon the filtering surface 2 of a filter 3, which may be any one of the several types of filters providing countercurrent washing and as herein described is a rotary platform filter.

Such a filter consists essentially of a filtering element covered with a filter cloth and carried on a large ball race and rotated by a chain drive in the clockwise direction indicated by the arrow and mounted on a filtrate-receiving pan. The filtrate pan is divided by vertical partitions into the main filter section 2, having a separate outlet 4 for strong phosphoric acid filtrate, a first wash section 5, having a strong wash water outlet 6, and a second wash section 7 having a weak wash water outlet 8. Ordinarily, fresh water is supplied to a spray pipe 9 on the wash section 7 and the filtrate is passed through a line 10 to a similar spray pipe 11 supplying the first wash section 5. By this procedure the residual phosphoric acid removed from the calcium sulfate filter cake on the second wash section 7 is joined with that removed in the first wash section 5, the combined washings being withdrawn from outlet 6 through line 12 as a dilute aqueous phosphoric acid of about 10–20% $P_2O_5$ content. The dilute aqueous phosphoric acid so obtained is usually pumped to the digester system.

In accordance with the present invention means are provided for mixing the phosphoric acid-containing wash water from line 12 with concentrated sulfuric acid and cooling the resulting mixture by concentration in a vacuum evaporator or cooler 15. A satisfactory mixing system may consist of an external recirculating line on the vacuum cooler through which diluted and cooled acid is pumped from the bottom of this cooler through a horizontal pipe projecting through the side wall thereof and discharged into its interior, this pipe having opposed side inlets for the strong sulfuric acid and the aqueous diluting acid. By this means the strong sulfuric acid and diluting wash water may be fed continuously into the vacuum cooler 15, wherein most of the heat generated by the sulfuric acid dilution is removed as the latent heat of vaporization of water by evaporation under reduced pressure.

The vacuum cooler 15 is provided in its upper portion with a vapor pipe 16 which connects with a barometric condenser 17 provided with a barometric leg 18 terminating at its lower end in a condensate tank 19. The tank 19 is, in turn, connected by a line 20 to the wash water spray pipe 9 of the second wash section 7 on the filter. By regulating the quantity of condensing water supplied to the barometric condenser 17 the water vapor removed from the vacuum cooler through line 16 can be condensed at a temperature sufficiently high to provide a hot condensate wash water, still further conserving the heat generated by the sulfuric acid dilution. In the example illustrated on the drawing the temperature of the condensate in tank 19 is about 120–130° F.

The following example illustrates the advantages obtained by the process of our invention. A dilute sulfuric acid-phosphoric acid mixture is prepared by mixing 103.6 parts by weight of 66° Baumé sulfuric acid with 229.2 parts of dilute aqueous phosphoric acid from the first filter section of the filter 3 having a phosphoric acid concentration corresponding to a 15% $P_2O_5$ content and a temperature of about 150° F. The resulting hot sulfuric acid, having a temperature above 200° F., has a vapor pressure permitting it to boil at moderate vacuums of 26–27 inches of mercury at 150° F., equivalent to the original temperature of the weak filtrate phosphoric acid. By maintaining the temperature of the mixed acids at 150° F. by such vacuum cooling the major portion of the heat of dilution is removed prior to the introduction of these mixed acids into the digestion system. In a continuous process such as is illustrated on the drawing the water removed by the vacuum evaporation results in an increased phosphoric acid content as compared with that of a mixture cooled by an ordinary heat exchange cooler.

The cooled digestion acid mixture is fed into the digester 1 with 112 parts by weight of ground phosphate rock having 34% $P_2O_5$ content and 311 parts by weight of recycled 32% $P_2O_5$ product phosphoric acid, which dilutes the slurry concentration to 22%. The heat generated by the digestion reaction will raise the digestion temperature to about 165° F., at which temperature readily filterable calcium sulfate dihydrate crystals are formed. Upon filtering the digestion slurry on the filter 3 and washing the filter cake with hot condensate from the condenser 17 a 32% $P_2O_5$ phosphoric acid product is obtained.

The quantity of dilution heat removed in the vacuum cooler 15 can be conveniently varied by selection of the degree of vacuum maintained in this cooler; vacuums within the range of 22–28 inches of mercury are easily obtainable by ordinary jet ejectors and may be used. Since the dilution heat of the concentrated sulfuric acid which can be removed by the vacuum cooler constitutes approximately 35% of the total wet process reaction heat, the process permits temperature control over the full range of practical digestion temperatures while simultaneously permitting an increase in the strength and quantity of the strong phosphoric acid obtained from the plant.

What we claim is:

1. A method for the production of phosphoric acid which comprises mixing with concentrated sulfuric acid a quantity of hot dilute aqueous phosphoric acid such as to provide both the amount of water necessary to dilute the mixture to a 25–40% sulfuric acid concentration and the additional amount of water which when converted into vapor will remove the heat of dilution as latent heat of vaporization, cooling the mixture to digestion temperatures at which a stable calcium sulfate dihydrate will form in the subsequent digestion process by subjecting it to vacuum evaporation, forming a hot condensate of the water removed by the vacuum evaporation, digesting ground phosphate rock by mixing it with said cooled digestion acid mixture and with recycled product phosphoric acid at said digestion temperatures and thereby forming a filterable slurry of calcium sulfate dihydrate in aqueous phosphoric acid, filtering the slurry and washing the filter cake with said hot condensate to remove a major portion of the phosphoric acid from said cake, and returning the resulting hot, dilute, aqueous phosphoric acid containing wash water for admixture with said concentrated sulfuric acid.

2. A method according to claim 1 wherein the digestion acid mixture is cooled by vacuum evaporation to temperatures of about 140–165° F.

References Cited in the file of this patent

UNITED STATES PATENTS

| | | |
|---|---|---|
| 1,003,681 | Williams | Sept. 19, 1911 |
| 1,836,672 | Larsson | Dec. 15, 1931 |
| 1,851,179 | Hechenbleikner | Mar. 29, 1932 |
| 1,940,689 | Moore | Dec. 26, 1933 |
| 2,032,457 | Acken | Mar. 3, 1936 |
| 2,065,848 | Anderson | Dec. 29, 1936 |
| 2,233,956 | Moore | Mar. 4, 1941 |
| 2,699,985 | Delruelle | Jan. 18, 1955 |